(12) United States Patent
Heidloff et al.

(10) Patent No.: US 8,195,746 B2
(45) Date of Patent: Jun. 5, 2012

(54) AUTOMATIC OFF-LINE AVAILABILITY FOR DOCUMENT CONTENT LINKED IN ELECTRONIC MAIL MESSAGES

(75) Inventors: Niklas Heidloff, Salzkotten (DE); Michael R. O'Brien, Westford, MA (US); Hardy Groeger, Bad Lippspringe (DE)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 11/078,773

(22) Filed: Mar. 11, 2005

(65) Prior Publication Data

US 2006/0206570 A1 Sep. 14, 2006

(51) Int. Cl.
*G06F 15/16* (2006.01)
(52) U.S. Cl. .................................... 709/206; 709/205
(58) Field of Classification Search ............... 709/205, 709/206
See application file for complete search history.

(56) References Cited

U.S. PATENT DOCUMENTS

| 6,356,937 | B1 | 3/2002 | Montville et al. | |
|---|---|---|---|---|
| 2001/0005855 | A1 | 6/2001 | Shaw et al. | |
| 2002/0099777 | A1* | 7/2002 | Gupta et al. | 709/206 |
| 2002/0131561 | A1* | 9/2002 | Gifford et al. | 379/67.1 |
| 2002/0138582 | A1* | 9/2002 | Chandra et al. | 709/206 |
| 2004/0133644 | A1 | 7/2004 | Warren et al. | |
| 2005/0076085 | A1* | 4/2005 | Budd et al. | 709/206 |
| 2005/0188016 | A1* | 8/2005 | Vdaygiri et al. | 709/205 |

* cited by examiner

*Primary Examiner* — Jerry Dennison
(74) *Attorney, Agent, or Firm* — David A. Dagg

(57) ABSTRACT

A system for providing automatic off-line availability of shared document content linked in electronic mail ("email") messages. Documents indicated by links in processed email messages may accessed when a client system user is working either online or offline. A software component operates to read through email messages sent to a client system user, and to locate messages including links to content stored on the server system. The software component accesses the content indicated by the links contained in the email messages, and moves the content onto the client system for offline access. The software component may include a periodically scheduled agent, and/or a component that is called just prior to the client system or email application going offline.

26 Claims, 3 Drawing Sheets

AUTOMATIC OFF-LINE AVAILABILITY FOR DOCUMENT CONTENT LINKED IN ELECTRONIC MAIL MESSAGES

FIELD OF THE INVENTION

The present invention relates generally to sharing documents among multiple users, and more specifically to a system and method for providing automatic off-line availability for shared document content linked in electronic mail messages.

BACKGROUND OF THE INVENTION

In existing computer software systems, there are a variety of approaches to sharing information among multiple users, and to enabling on-line discussion of topics. Some existing systems are designed for sharing and discussing on-line content among a "team" of users, in constructs referred to by terms such as "teamspaces" or the like. For example, the IBM Lotus Domino® system provides "teamrooms", Quickplaces®, and other databases for sharing content stored on a server computer system. The IBM Workplace™ products and services also provide shared document libraries and on-line discussions, based on constructs referred to as Workplace Teamspaces™. Some of these server-side teamspace systems support notifications sent via electronic mail ("email") messages indicating that content has been added to the server-side shared document set. In Domino® teamrooms, for example, a user can subscribe to notifications regarding changes to a shared database.

A problem in existing systems results from the fact that the email notification messages rely on links to documents stored on the server system. These notifications are effective in making users aware that changes have been made to the shared document set. However, to see what has changed, a notified user must open the remotely stored document indicated by the link. Some existing systems only send links to server stored content, together with a subject field value. Unfortunately, when a client system user goes offline, links to server stored content become virtually useless. While an offline, client system user can tell that something has been changed in the shared document set, they cannot access the changed content.

Some document sharing systems, such as Lotus Notes®, make the shared content available offline by replicating the shared database onto the client system. However, using this approach, the client side replications are defined by the boundaries of the shared database. A offline user cannot access content from other teamspaces. Users must to explicitly indicate certain databases for replication. They cannot simply have everything automatically available that might be indicated by links in notifications in their email Inbox. Additionally, a system that relies on complete database replication to the client system for offline access may result in downloading more information than necessary, resulting in wasted bandwidth and storage on the client system.

SUMMARY OF THE INVENTION

To address the above described and other shortcomings of the prior art, a system and method are disclosed for providing automatic off-line availability of shared document content linked in electronic mail ("email") messages. Email messages processed by the disclosed system include links to content stored on a remote server system. The links may be of any specific kind, such as a Uniform Resource Locators (URLs) or the like. The content indicated by the links in the email messages may both when the user is working offline, such as when the client system is not connected to the Internet. Accordingly, the disclosed system advantageously enables offline users to see the actual content of documents indicated by links contained in email messages.

The email messages processed by the disclosed system may be of any specific type. One type of email message processed by an embodiment of the disclosed system are notification messages regarding accesses to a shared document set. In such an embodiment, accesses and/or changes to shared content are detected, and notifications are provided to interested users through email messages containing links to the relevant content.

A software component operates on the client and/or server system to examine email messages sent to a client system user, and to identify messages including links to content stored on the server system. The software component accesses the content indicated by the links contained in the email messages, and moves the content onto the client system for offline access. The software component may include a periodically scheduled agent, and/or a component that is called just prior to the client system or email application going offline. In an embodiment using an agent running on the client system, such a component could advantageously use access rights of the client system user, thus avoiding potential authentication problems when accessing content on the server system. This approach uses the client system user's credentials through impersonation, which can be performed relatively safely by an agent running on the client system.

A graphical user interface may generated including an interface display object, such as a button, pull down menu, or the like, allowing a user to indicate that all content linked by some set of email messages be immediately accessed on the server system and moved to the client system. For example, the user may be allowed to indicate a preceding time period, such that all email messages received during that time period are to be processed. This enables the user to move only the content they need from the server system, such as only that content linked by email notifications received within the last day, week, or month.

The software component responsible for moving content linked through email notifications from the server system to the client system may operate to intercept email messages, determine whether they contain links to content stored on the server, and make such linked content available for offline access on the client system. Moving the content to the client system may be accomplished in a variety of ways, such as sending a copy of the content to the client system in an attachment to the intercepted message, or within a separate message.

To ensure that the content moved to the client system is accessible to the client system user, the disclosed system may determine and maintain a record of types of application software available on the client system. With such information, any necessary document format conversions may be made on the server system, prior to moving the content to the client system, in order to match the available client side software. In one embodiment, if the document format is not supported on the client, an HTML converter is used to convert the document to HTML. The determination of whether a document type is supported may be made based on the contents of a document type registry on the client system indicating which document types can be downloaded without conversion. Alternatively, if a document type is not supported on the client system, the content may be converted from whatever format it is stored in on the server system to HTML (HyperText Markup Language), and then moved to the client system. This would anticipate that a Web browser capable of rendering HTML would be available on the client system. An HTML copy of content on the client system would provide at least a readable copy for offline access.

Software on the client system may be provided for handling off-line accesses to content moved from the server system to the client system. Such software may be internal or external to an email client application component, and operate to intercept requests for content that has been moved from the server system to the client system. The intercepted requests are then re-directed to a local store on the client system containing the local copy of the content moved from the server system.

While the disclosed system may be embodied to provide access to server side content indicated by links contained in shared document set email notifications, it is not limited to such an embodiment. Accordingly, those skilled in the art will recognize that the present invention may be embodied to provide access to any server side content indicated by links contained in any email messages, whether or not they are notifications of actions performed on shared document sets. Similarly, while the description makes reference, for purposes of explanation, to specific kinds of links, shared content repositories, and types of shared documents and content, it can be applied to any specific kind of link, shared repository, and/or document or content type.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
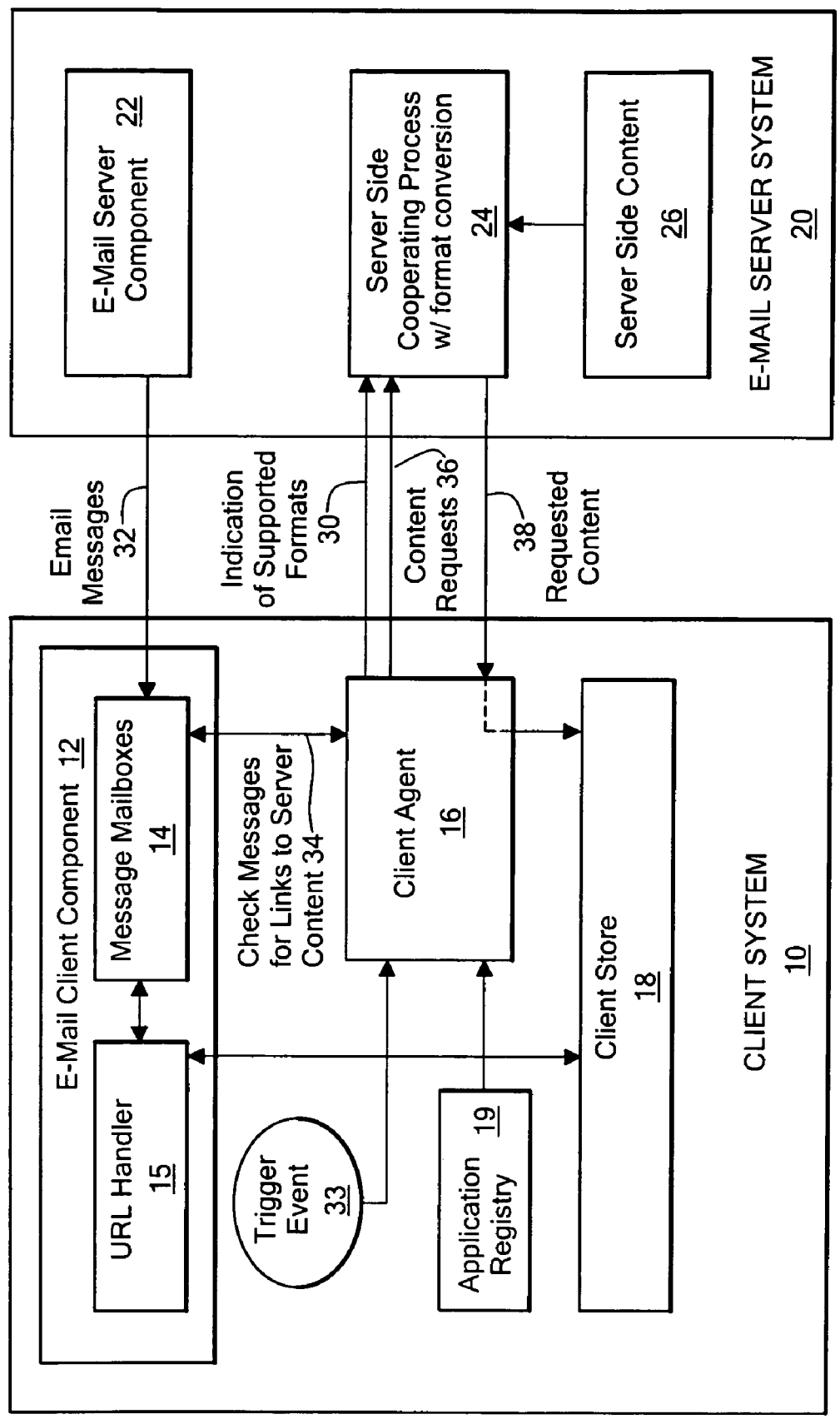
FIG. 1 is a block diagram showing software components in a first illustrative embodiment of the disclosed system.

As shown in FIG. 1, an illustrative embodiment of the disclosed system operates using a number of software components executing on at least one client computer system, shown for purposes of illustration as the client system 10, and at least one server computer system, shown for purposes of illustration as electronic mail ("email") server system 20. The client system 10 and email server system 20 may, for example, each include at least one processor, program storage, such as memory, for storing program code executable on the processor, and one or more input/output devices and/or interfaces, such as data communication and/or peripheral devices and/or interfaces. The client system 10 and email server system 20 are communicably connected by a data communication system, such as a Local Area Network (LAN), the Internet, or the like. The client system 10 and email server system 20 may further include appropriate operating system software.

The client system 10 is shown including an email client software component 12 including a number of message mailboxes 14, such as an "Inbox" for received email messages, user defined message folders, and/or other specific mailboxes, and a URL handler component 15. A client agent software component 16 is shown communicable with an application registry 19, as well as a client store 18. The application registry 19 may include any specific type of indications regarding software applications that are installed or otherwise available for processing documents or other content. The client store 18 may include a database or other type of content storage capable of storing documents, files, images, or other types of content. The client store 18 is accessible to other applications executing on the client system 10, such as a Web browser application program operable to render HTML documents stored in the client store 18.

The email server system 20 is shown including an email server software component 22, as well as a cooperating process 24 executing on the email server system 20. The process 24 includes document format conversion functionality, such as program code operable to convert documents in one or more predetermined document formats to HTML documents. The process 24 has access to a server side content store 26. The server side content store 26 may, for example, consist of a database other type of content storage capable of storing documents, files, images, or other types of content.

During operation of the software components shown in FIG. 1, email messages 32 are sent from the email server component 22 to the email client component 12, for storage in the message mailboxes 14. The client agent 16 provides indication of supported formats 30 to the server side cooperating process 24. The indication 30 enables the server side process 24 to know which document formats are accessible to a user of the client system 10.

Further during operation of the software components shown in FIG. 1, a trigger event 33 is detected by the client agent 16, causing the client agent 16 to process some number of email messages in the message mailboxes 14. For example, the trigger event 33 may be an indication that the client system 10 is about to go offline. Such a trigger would allow content on the email server system 20 indicated by links in received email messages to be loaded onto the client system 10 for access after the client system 10 goes offline. The client system 10 may be considered to have gone offline when it is not connected to the Internet or other communication network connecting it to the email server system 20.

Another example of the trigger event 33 is expiration of a predetermined period of time, in which case the client agent 16 would be a periodically invoked process. Alternatively, the trigger event 33 may be generated as a result of a user interaction with a graphical user interface generated by the email client component 12, or some other software application executing on the client system 10. For example, such a user interface may enable a user to enter a preceding time period during which received email messages are to be processed, or may simply include a graphical button or other graphical display object enabling the user to indicate that a number of received email messages are to be processed by the client agent 16. The user may further be allowed to indicate which of the message mailboxes 14 are to be processed by the client agent 16.

The client agent 16 processes email messages by checking 34 whether the messages include a link, such as a URL ("Uniform Resource Locator") or the like, indicating content stored on the email server system 20, for example within the server side content 26. In the event that such a link is found in one of the processed email messages, the client agent 16 issues a request for indicated content, shown as the content requests 36 in FIG. 1. The content requests 36 are conveyed to the server side cooperating process 24, which locates the requested content in the server side content 26, and determines whether the requested content should be converted to another format before being conveyed to the client system 10.

For example, if the requested content is in a format that is not supported by a software application on the client system 10, the process 24 may convert the content to another format that is supported on the client system 10. Alternatively, the process 24 may simply convert all requested content to HTML prior to sending it to the client system 10, such that the content can be rendered to a client system user by a Web browser program executing on the client system 10.

When the client agent 16 receives the requested content 38 from the server side process 24, it stores the content in the client store 18. When a user subsequently reads an email message within the message mailboxes 14 including a link indicating the content, the user is able to access the indicated content, even if the client system 10 is off-line, by way of the locally stored copy contained in the client store 18.

For example, in one embodiment, when the client system 10 is off-line, and a user is reading the email messages within the messages mailboxes, the user may click on a link in such messages, where the link is a URL indicating the content on the server system 20. This results in a content request including the URL indicating the content on the server system 20. Such content requests are intercepted by the URL handler component 15 within the email client 12. The URL handler 15 may operate to translate the URL in the intercepted request into a URL indicating the local copy of the requested content within the client store 18. Alternatively, the URL handler 15 may itself handle the intercepted content request, and return the local copy of the requested content without accessing the server system 20. In this way, requests on the client system 10 for content that has been copied to the client system 10 from the server system 20 are processed without sending or attempting to send the requests to the server system 20 when the client system 10 is offline.

Figure 2:
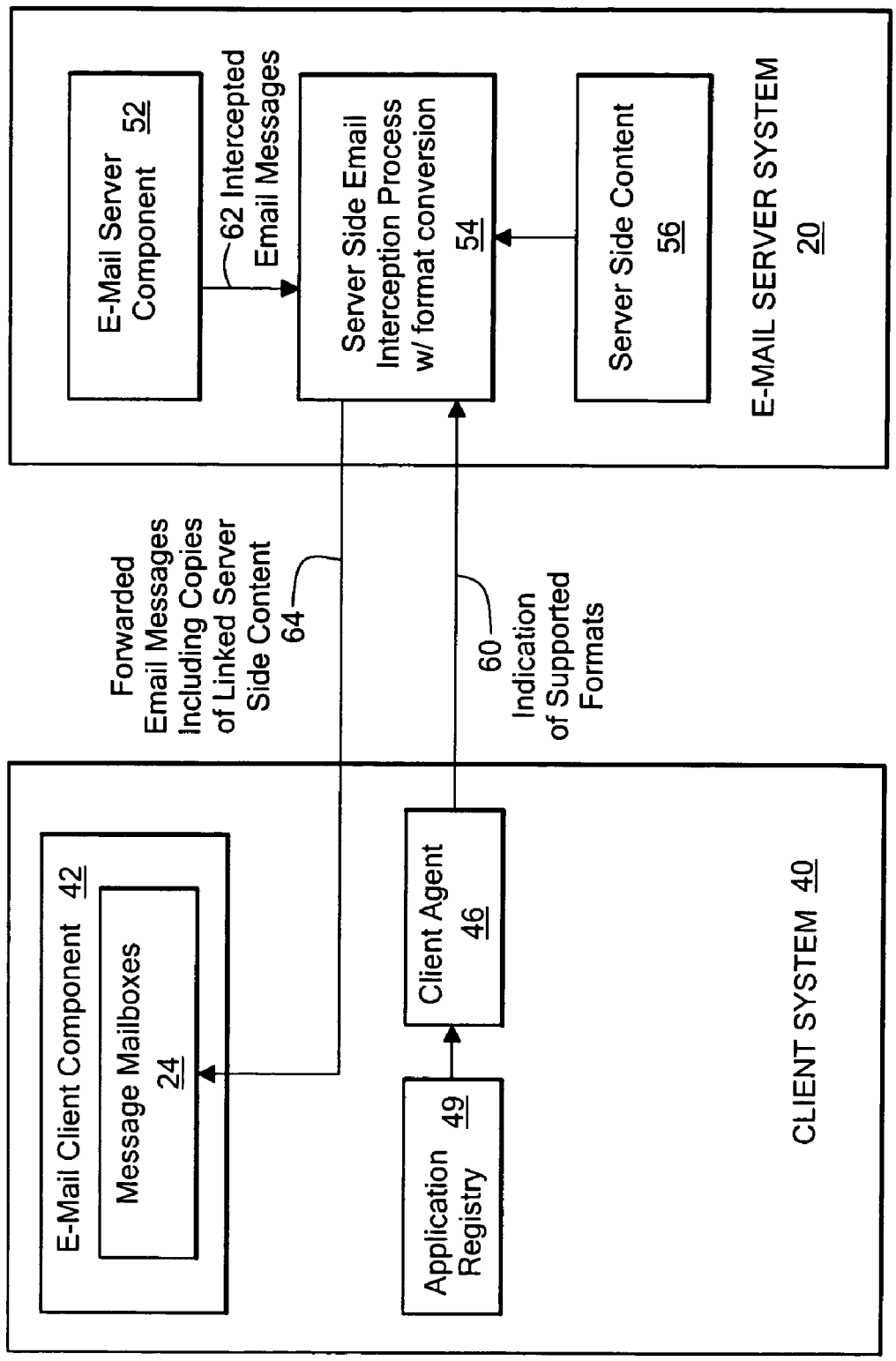
FIG. 2 is a block diagram showing software components in a second illustrative embodiment of the disclosed system.

FIG. 2 shows another illustrative embodiment of the disclosed system. As shown in FIG. 2, an illustrative embodiment of the disclosed system operates using a number of software components executing on at least one client computer system, shown for purposes of illustration as the client system 40, and at least one server computer system, shown for purposes of illustration as electronic mail ("email") server system 50. The client system 40 and email server system 50 may, for example, each include at least one processor, program storage, such as memory, for storing program code executable on the processor, and one or more input/output devices and/or interfaces, such as data communication and/or peripheral devices and/or interfaces. The client system 40 and email server system 50 are communicably connected by a data communication system, such as a Local Area Network (LAN), the Internet, or the like. The client system 40 and email server system 50 may further include appropriate operating system software.

The client system 40 is shown including an email client software component 42 including a number of message mailboxes 44, such as an "Inbox" for received email messages, user defined message folders, and/or other specific mailboxes. A client agent software component 46 is shown communicable with an application registry 49. The application registry 49 may include any specific type of indications regarding software applications that are installed or otherwise available for processing documents or other content.

The email server system 50 is shown including an email server software component 52, an email message interception process 54, which includes document format conversion functionality. The process 54 includes document format conversion functionality, such as program code operable to convert documents in one or more predetermined document formats to HTML documents. The process 54 has access to a server side content store 56. The server side content store 56 may, for example, consist of a database other type of content storage capable of storing documents, files, images, or other types of content.

During operation of the components shown in FIG. 2, the client agent 46 provides indication of supported formats 60 to the server side cooperating process 54. The indication 60 enables the server side process 54 to know which document formats are accessible to a user of the client system 40.

The server side process 54 further operates to process the intercepted email messages 62 that are sent by the email server component 52 to the client system 40. The process 54 process these intercepted messages by checking whether the intercepted messages include a link, such as a URL ("Uniform Resource Locator") or the like, indicating content stored on the email server system 50, for example within the server side content 56. In the event that such a link is found in one of the intercepted email messages, the server side process 54 locates the indicated content in the server side content 56, and determines whether the indicated content should be converted to another format before being conveyed to the client system 40. For example, if the requested content is in a format that is not supported by a software application on the client system 40, the process 54 may convert the content to another format that is supported on the client system 40. Alternatively, the process 54 may simply convert all requested content to HTML prior to sending it to the client system 40, such that the content can be rendered to a client system user by a Web browser program executing on the client system 40.

The indicated content, whether converted or not, is sent to the client system 40 within the forwarded email messages 64, which include copies of the indicated content. For example, the indicated content may be included as one or more document attachments to forwarded email messages containing the corresponding links. Alternatively, the indicated content may be sent within or attached to email messages separate from the messages containing the corresponding links.

Figure 3:
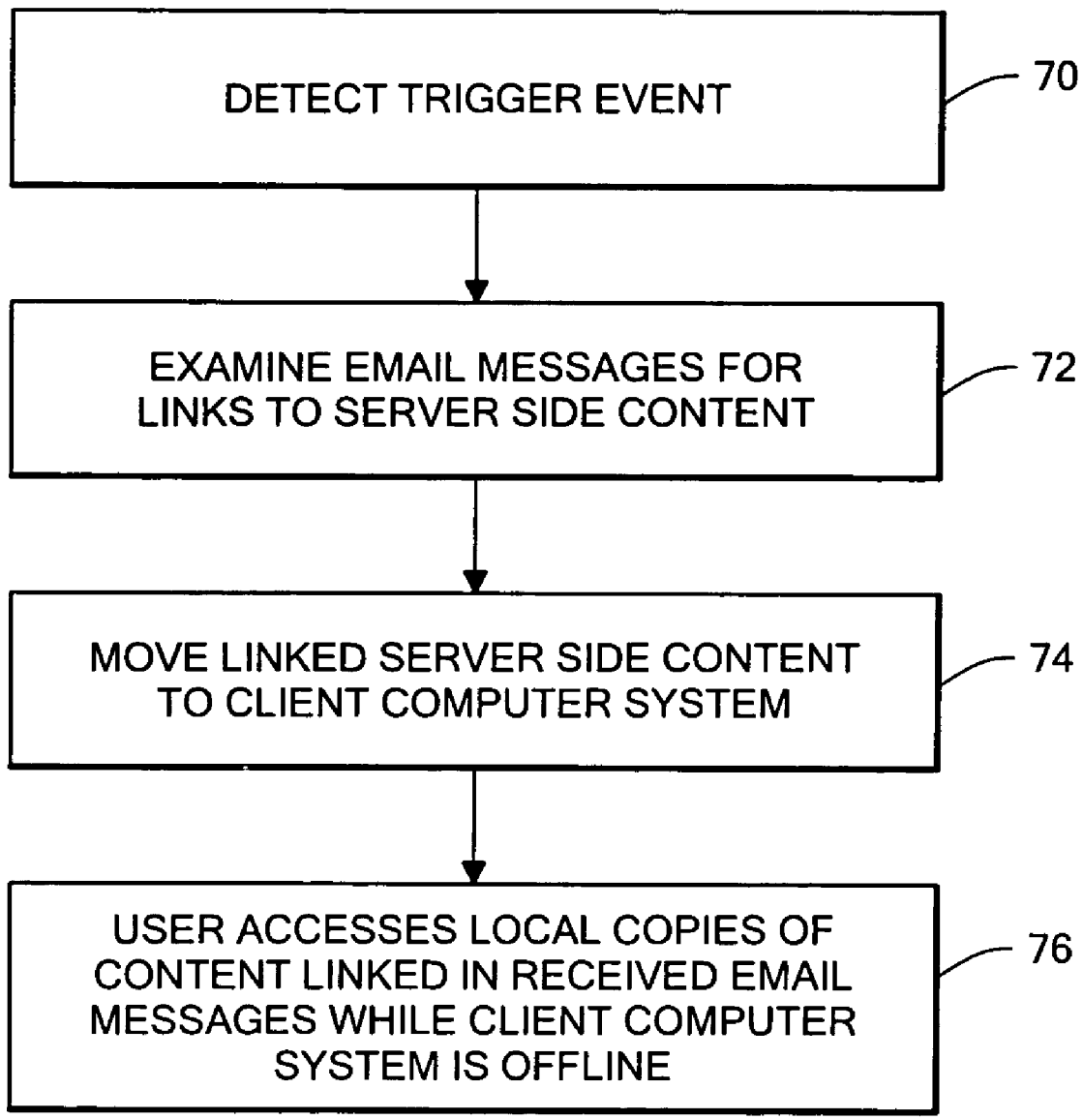
FIG. 3 is a flow chart showing steps performed by an embodiment of the disclosed system.

FIG. 3 is a flow chart showing steps performed by an embodiment of the disclosed system. At step 70, a trigger event is detected causing the disclosed system to process some number of email messages. Any specific type of trigger event may be detected, such as expiration of a predetermined time period, receipt of a user request through a graphical user interface, or detection of an event indicating that the client computer system is about to go offline. At step 72, one or more email messages are processed to determine whether they include links to content stored on a server system remote from the client system that the messages were sent to. At step 74, content indicated by one or more links contained in the email message or messages processed at step 74 is moved from the server system to the client system. The content moved from the server system to the client system may be converted to a format supported on the client system before it is conveyed to the client system. Various specific tools are available to accomplish document format conversion, including tools that provide conversion from various input formats to HTML format output documents. See for example, the Stellent Outside In® product. At step 76, as a result of the moving of the content from the server system at step 74, a user of the client system accesses copies of the content linked through received email messages while the client computer system is offline. For example, the disclosed system may include a content request handler that operates when the client computer system is offline to intercept requests for content indicated by links to a remote server system. The request handler may operate to replace the links pointing to the remote server system with pointers, names or links indicating local copies of requested content, or simply return the requested content after obtaining it from a local store on the client computer system.

FIGS. 1-3 are block diagram and flowchart illustrations of methods, apparatus(s) and computer program products according to an embodiment of the invention. It will be understood that each block of FIGS. 1-3, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A method for providing offline access to content indicated by links contained in electronic mail messages, comprising:
    processing a set of electronic mail messages previously sent to a client system, wherein said processing includes examining said set of electronic mail messages to identify a subset of said electronic mail messages containing links indicating content, wherein said content is external to said electronic mail messages and stored on a server system, and wherein each electronic mail message in said identified subset of said electronic mail messages contains at least one link to said content stored on said server system; and
    copying, responsive to said links contained in said identified subset of said electronic mail messages, said content stored on said server system to said client system.

2. The method of claim 1, wherein said links comprise uniform resource locators.

3. The method of claim 1, further comprising:
    detecting a predetermined operation on a document in a set of shared documents stored on said server system;
    wherein said electronic mail messages comprise a notification message indicating that said predetermined operation has been performed on said document in said set of shared documents stored on said server system; and
    wherein said content stored on said server system and copied to said client system comprises at least one document in said set of shared documents.

4. The method of claim 1, wherein said steps of processing and copying are performed by a software agent, wherein said software agent is triggered by an indication that said client system is going offline.

5. The method of claim 1, wherein said steps of processing and copying are performed by a software agent, wherein said software agent is triggered periodically.

6. The method of claim 1, wherein said steps of processing and copying are triggered by a request received from a user of said client computer system.

7. The method of claim 6, wherein said request includes indication of a preceding time period during which said electronic email messages to be processed were received.

8. The method of claim 1, wherein said copying comprises:
    determining a set of document types that can be processed on said client system;
    determining a type of said content stored on said server system; and
    in the event that said type of said content stored on said server system is not within said set of document types that can be processed on said client system, converting said content stored on said client system to a document type within said set of document types that can be processed on said client system.

9. The method of claim 1, wherein said copying comprises converting said content stored on said server system to HTML.

10. The method of claim 1, wherein said copying comprises sending said content stored on said server system to said client system as an attachment to a corresponding one of said electronic mail messages.

11. The method of claim 1, wherein said copying comprises sending said content stored on said server system to said client system in another electronic mail message independent of one of said electronic mail messages including said link to said content stored on said server system.

12. The method of claim 1, further comprising:
    in the event that said client system is offline, intercepting, in said client system, a content request including a link to content stored on said server system; and
    accessing, in response to said intercepted content request including said link to said content stored on said server system, a local copy of said content stored on said server system, wherein said local copy was previously copied to said client system from said server system.

13. A system having a computer readable memory, said computer readable memory having a computer program for providing offline access to content indicated by links contained in electronic mail messages stored thereon, said computer program comprising:
    program code for processing a set of electronic mail messages previously sent to a client system, wherein said processing includes examining said set of electronic mail messages to identify a subset of said electronic mail messages containing links indicating content, wherein said content is external to said electronic mail messages and stored on a server system, and wherein each electronic mail messages in said identified subset of said electronic mail messages contains at least one link to said content stored on said server system; and program code for copying, responsive to said links contained in said identified subset of said electronic mail messages, said content stored on said server system to said client system.

14. The system of claim 13, wherein said links comprise uniform resource locators.

15. The system of claim 13, said computer program further comprising:

program code for detecting a predetermined operation on a document in a set of shared documents stored on said server system;

wherein said electronic mail messages comprise a notification message indicating that said predetermined operation has been performed on said document in said set of shared documents stored on said server system; and wherein said content stored on said server system and copied to said client system comprises at least one document in said set of shared documents.

16. The system of claim 13, wherein program code for processing and program code for copying comprise a software agent, wherein said software agent is triggered by an indication that said client system is going offline.

17. The system of claim 13, wherein said program code for processing and program code for copying comprise a software agent, wherein said software agent is triggered periodically.

18. The system of claim 13, wherein said steps of processing and copying are triggered by a request received from a user of said client computer system.

19. The system of claim 18, wherein said request includes indication of a preceding time period during which said electronic email messages to be processed were received.

20. The system of claim 13, wherein said program code for copying comprises:

program code for determining a set of document types that can be processed on said client system;

program code for determining a type of said content stored on said server system; and program code for, in the event that said type of said content stored on said server system is not within said set of document types that can be processed on said client system, converting said content stored on said client system to a document type within said set of document types that can be processed on said client system.

21. The system of claim 13, wherein said program code for copying comprises program code for converting said content stored on said server system to HTML.

22. The system of claim 13, wherein said program code for copying comprises program code for sending said content stored on said server system to said client system as an attachment to a corresponding one of said electronic mail messages.

23. The system of claim 13, wherein said program code for copying comprises program code for sending said content stored on said server system to said client system in another electronic mail message independent of one of said electronic mail messages including said link to said content stored on said server system.

24. The system of claim 13, further comprising:

program code for, in the event that said client system is offline, intercepting, in said client system, a content request including a link to content stored on said server system; and program code for accessing, in response to said intercepted content request including said link to said content stored on said server system, a local copy of said content stored on said server system, wherein said local copy was previously copied to said client system from said server system.

25. A computer program product having a physical computer readable storage medium, said physical computer readable storage medium having a computer program for providing offline access to content indicated by links contained in electronic mail messages stored thereon, said computer program comprising:

program code for processing a set of electronic mail messages previously sent to a client system, wherein said processing includes examining said set of electronic mail messages to identify a subset of said electronic mail messages containing links indicating content, wherein said content is external to said electronic mail messages and stored on a server system, and wherein each electronic mail message in said identified subset of said electronic mail messages contains at least one link to said content stored on said server system; and program code for copying, responsive to said links contained in said identified subset of said electronic mail messages, said content stored on said server system to said client system.

26. A method for providing offline access to content indicated by links contained in electronic mail messages, comprising:

processing a set of electronic mail messages previously sent to a client system, wherein said processing includes examining said set of electronic mail messages to identify a subset of said electronic mail messages containing links indicating content, wherein said content is external to said electronic mail messages and stored on a server system, and wherein each electronic mail message in said identified subset of said electronic mail messages contains at least one link to said content stored on said server system;

copying, responsive to said links contained in said identified subset of said electronic mail messages, said content stored on said server system to said client system;

in the event that said client system is offline, intercepting, in said client system, a content request including a link to content stored on said server system; and accessing, in response to said intercepted content request including said link to said content stored on said server system, a local copy of said content stored on said server system, wherein said local copy was previously copied to said client system from said server system.

* * * * *